Jan. 15, 1952 S. KALTOFT 2,582,337
TWO-WAY PLOW
Filed May 16, 1950 3 Sheets-Sheet 1

INVENTOR.
SIGURD KALTOFT
BY Wm Edward Hann
Attorney

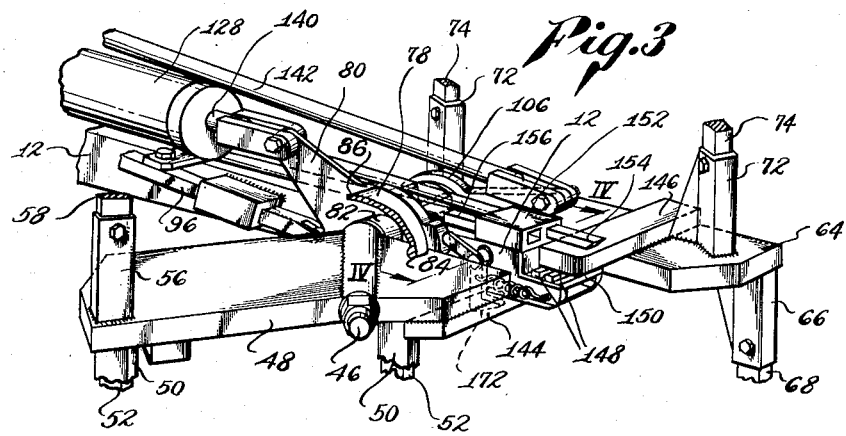
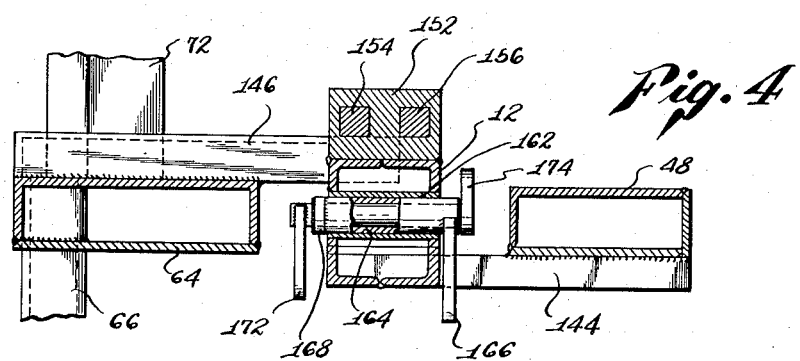
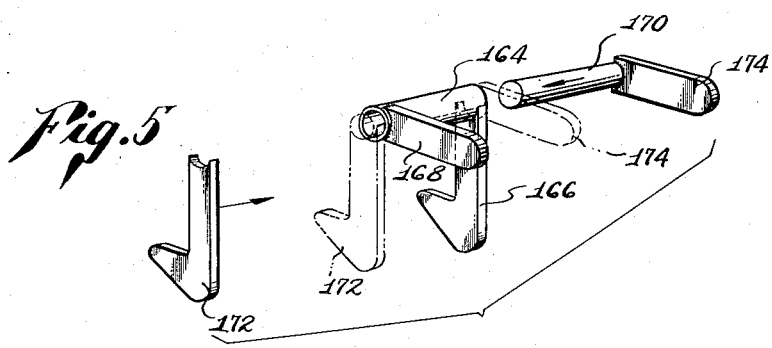

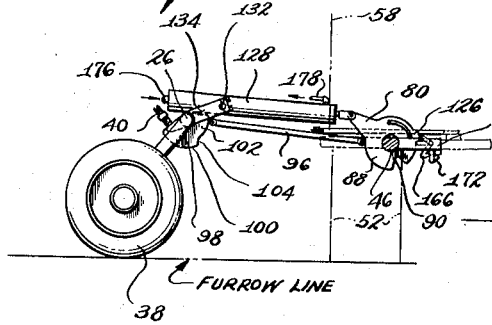
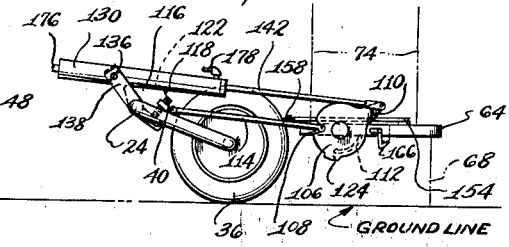
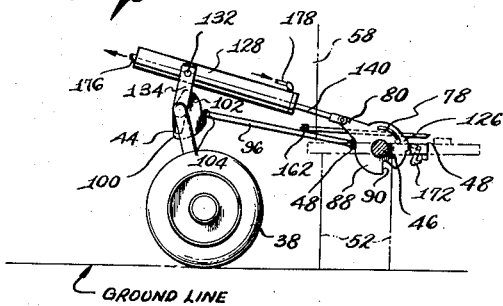
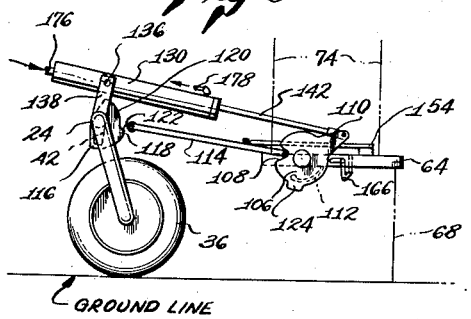
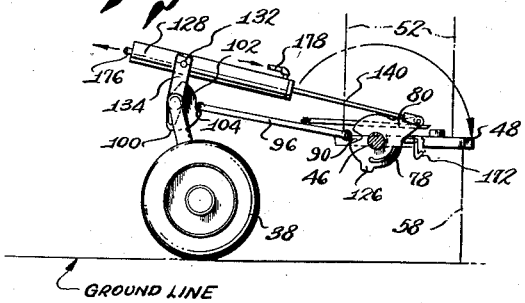
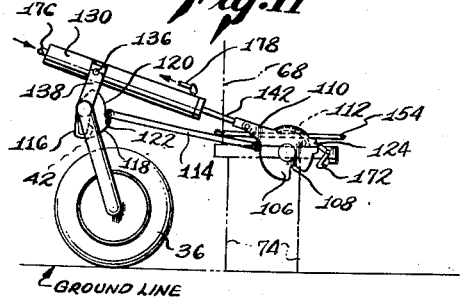

Patented Jan. 15, 1952

2,582,337

UNITED STATES PATENT OFFICE 2,582,337

TWO-WAY PLOW

Sigurd Kaltoft, Bakersfield, Calif., assignor of one-half to George Delfino and Sons, Bakersfield, Calif., a copartnership Application May 16, 1950, Serial No. 162,245

4 Claims. (Cl. 97—25)

This invention relates to a two-way plow.

Objects of the invention are: to provide a plow having several bottoms, some of which are vertically reversed relative to the others and wherein the bottoms can be reversed in order that successive sets of furrows of the same hand can be made across a field and wherein the reversing mechanism can be easily controlled through suitable fluid pressure means; to provide a reversible two-way plow including a wheel supported frame and wherein a wheel or wheels can be moved to raise and lower the frame relative to the plow bottoms; to provide synchronized power means for producing relative movement of the wheels and plow bottoms to facilitate reversal of the plows; and to provide power actuated locking means for securing the plow and wheel or wheels in predetermined relative positions and synchronously releasing them during the reversing operation.

The above and other objects and advantages will more fully appear from the following description in connection with the accompanying drawing wherein:

Fig. 3 is an enlarged perspective detail of the plowshare tilting and locking mechanism.

Fig. 4 is an enlarged fragmentary sectional detail taken approximately on the line IV—IV of Fig. 3.

Fig. 5 is an enlarged exploded perspective of a portion of a plow locking means with certain parts in full and broken lines in their separated and assembled positions.

Figs. 6 through 11 are somewhat diagrammatic side elevational views showing a ground wheel and a plow tilting lever in different relative positions and illustrating the manner of reversal of the device.

Figure 1:
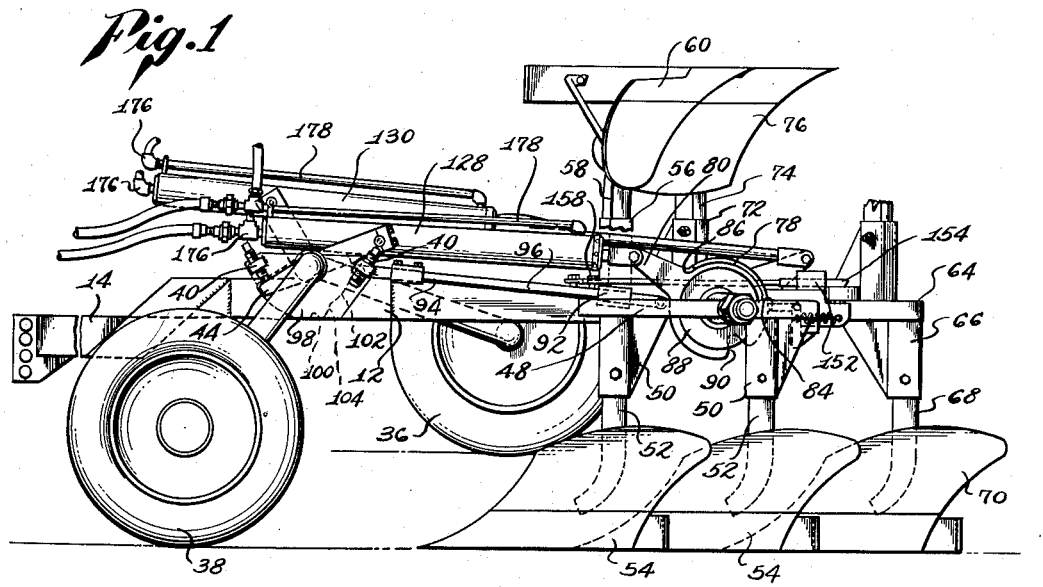
Fig. 1 is a side elevational view of an embodiment of the invention.

The plow has a horizontal longitudinal main frame 12 with a downwardly stepped drawbar portion 14. The frame 12 has oppositely extending wings 16 in outwardly converging pairs joined at their outer ends by bearing units 18 and end plates 20. Bearing units 22 extend between the inner ends of each pair of wings 16. One pair of bearing units 18 and 22 supports an axle section 24 and the other pair of bearing units 18 and 22 supports an axle section 26. Each axle section has an angular portion 28 and 30 and each angular portion supports a stub axle section 32 and 34. Ground wheels 36 and 38 are rotatably mounted on the axle sections 32 and 34. Swinging movement of each ground wheel about the axis of its axle section 24 or 26 is limited by adjustable stops 40 which are mounted in spaced relation on the end plates 20 and are adapted to be engaged alternately by arms 42 and 44 on axle sections 24 and 26, respectively.

Figure 2:
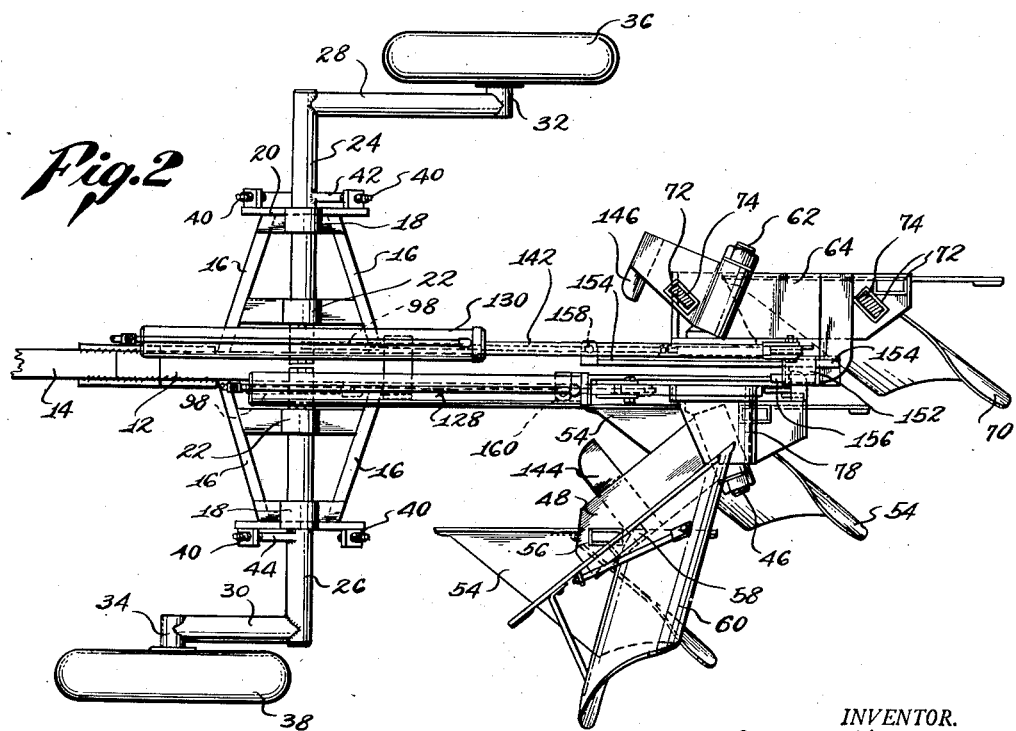
Fig. 2 is a plan view with certain of the upwardly disposed and inverted plowshares removed.

Adjacent the rear or right hand end of the main frame 12 is a left hand plow assembly supporting shaft 46. Mounted upon and rotatable about the shaft 46 is a plowshare bracket plate 48 which, in Figs. 1 and 2, is provided with a pair of downwardly extending sockets 50 in which are removably received vertical posts 52 which support plowshares 54 on their lower ends. Extending upwardly from the plate 48 is a socket 56 having a plowshare post 58 received therein to support an inverted plowshare 60.

The main frame 12 has a second plowshare assembly supporting shaft 62 extending from its side opposite to the shaft 46, both shafts being directed diagonally rearwardly. A plowshare unit supporting plate 64 is pivotally carried by the shaft 62. In the position of Figs. 1 and 2, the plate 64 has a single socket 66 extending downwardly therefrom. In this socket is a plowshare post 68 to which is secured a plowshare 70. Extending upwardly from the plate 64 are sockets 72 in which are plowshare supporting posts 74. Each of the posts 74 supports a plowshare 76. Only one of the plowshares 76 is illustrated in Fig. 1, and neither of these shares is shown in Fig. 2. However, it should be understood that the two shares 76 in the position of Figs. 1 and 2 are inverted as is the plowshare 60 on the left hand unit.

Rotatably mounted on the inner end of the plowshare assembly supporting shaft 46 is an arcuate cam 78. The cam is secured to a cam lever 80 which is provided with a collar 82 rotatable about the inner end of the shaft 46. The cam 78 has edges 84 and 86 which are adapted to bear alternately against portions of the plate 48 at opposite sides of said shaft 46.

The cam lever 80 includes a disk-like portion 88 having a cam notch 90 therein.

Slidably supported in sleeves 92 and 94 on the frame 12 is a longitudinally disposed cam link 96 which lies in the same plane as the cam disk 88. Mounted on the inner end of the wheel axle section 26 is a cam plate 98 having a high arcuate portion 100, a low arcuate portion 102 and an intermediate abutment portion 104. The cam plate 98 is fixed on the axle section 26 to rotate therewith and it is in the same plane as the forward end of the cam link 96.

The right hand side of the apparatus is provided with cams, cam plates, cam levers and cam links in the same manner as the left hand side just described. These elements are best indicated in Figs. 7, 9 and 11. These figures show a cam disk 106 having a notch 108 and a cam lever 110. The cam disk 106 has an arcuate cam member 112 extending therefrom. A cam link 114 is mounted for sliding movement longitudinally of the frame 12, similarly to the link 96 described above. On the inner end of the wheel axle section 24 is a cam plate 116 having a high portion 118, a lower portion 120 and an intermediate abutment 122.

The rear cam plate 106 has a catch abutment 124 thereon and the other rear cam plate 88 in the left hand assembly has a similar abutment 126, as shown in Figs. 6, 8 and 10.

Intermediate the ends of the frame 12 and slightly above the frame are fluid cylinders 128 and 130. The cylinder 128 is pivotally connected at 132 to a crank arm 134 which is rigidly secured to the wheel axle section 26. The cylinder 130 is pivotally connected at 136 to a crank arm 138 on the wheel axle section 24.

Piston rods 140 and 142 extend from their respective cylinders 128 and 130 and are pivotally connected to the cam levers 80 and 110, respectively.

The plow unit supporting plate 48 has an inward extension 144 and the plate 64 at the opposite side of the frame is provided with an inward extension 146. In Fig. 3, the right hand plate extension 146 is shown resting upon a pair of bumpers 148 on a plate 150 at the rear end of the frame 12. The frame is shown in Fig. 3 to be cut away vertically at the point where the plate 150 is attached. On the rear top portion of the frame 12 is a block 152 through which a pair of latching bolts 154 and 156 are slidable. The bolt 154 is connected at 158 to the right hand cam link 144 to be moved thereby. The bolt 156 is connected at 160 to the cam link 96 to be moved thereby.

Referring to Figs. 4 and 5, the frame 12 is shown with a sleeve 162 passing therethrough to rotatably support an inner sleeve 164 approximately beneath the block 152 through which the latching bolts 154 are slidable. Connected to the right hand end of the sleeve 164 is a hook 166. Extending from the other end of the sleeve 164 is a crank arm 168. A stub shaft 170 is rotatably supported in the sleeve 164. One end of this shaft has a hook 172 welded thereto and the other end of the shaft is provided with a crank arm 174.

As viewed in Figs. 3 and 4, the inward extension 144 of the plow unit supporting plate 48 lies beneath the frame 12 and is held by the hook 166. (The arrangements in Figs. 4 and 5 are viewed from the opposite direction as distinguished from their relationships in Fig. 3.)

The fluid cylinders 128 and 130 are shown with fluid pressure inlet connections 176 and 178. Through suitable control valve mechanism not shown, fluid under pressure is adapted to be admitted to either end of each of the cylinders 128 and 130.

The vertical broken lines in Figs. 6, 8 and 10 represent the plowshare supporting posts 52 and 58 on the left hand plow assembly, as viewed in Figs. 1 and 2. The vertical broken lines in Figs. 7, 9 and 11 represent the plowshare supporting posts 68 and 74 which form part of the right hand assembly. The position of the plow in Figs. 1 and 2 is diagrammatically illustrated in Figs. 6 and 7, Fig. 6 illustrating the left hand portion and Fig. 7 illustrating the right hand portion. The left hand ground wheel 38 is lower than the wheel 36, said wheel 38 functioning as a furrow wheel in that position. Wheel 36 in its elevated position of Fig. 7 is functioning as a ground wheel.

When the plows are to be reversed, fluid pressure is admitted to piston 128 through the conduit 176. The furrow wheel 38 will swing more freely than the plow section on the same side on the frame 12. The furrow wheel 38 will swing from the position of Fig. 6 to the position of Fig. 8. At this point the abutment 104 on the cam plate 98 will engage the end of the cam link 96 and prevent further rearward swinging movement of the wheel 38. In the position of Fig. 8 the plowshares 54 which are the downwardly disposed plowshares on the left hand unit, will be at least partially freed from the ground. Continued application of pressure to the left hand end of the cylinder 128 will cause the cam lever 80 on the cam plate 88 to swing in a clockwise direction. This is due to the fact that the ground wheel 38 is held against further rearward swinging, thereby holding the cylinder 128 and permitting the piston rod 140 to move rearwardly and out of said cylinder 128.

As the cam plate 88 rotates in a clockwise direction, the arcuate cam 78 will bear against the left hand plow unit supporting plate 48 and swing the left hand plow assembly to a vertically reversed position, as indicated in Fig. 10. The arcuate cam 78 swings the left hand plow unit about the shaft 46 until the center of gravity of the plow unit has passed a line extending vertically upwardly from said shaft 146. Thereafter the weight of the plow unit will complete the reversal of movement from the position of Figs. 6 and 8 to that of Fig. 10.

When the left hand plow unit is reversed and in the position of Fig. 10, the abutment 104 will force the cam link 96 rearwardly, provision for such movement having been made by the movement of the cam notch 98 to a point which will permit limited rearward movement of the cam link 96. Thereupon the wheel 38 can swing further rearwardly or in a counterclockwise direction to a position equivalent to the position of wheel 36 in Fig. 1.

As stated above, when the left hand unit is in the position of Fig. 6, the right hand unit is in the position of Fig. 7. As fluid under pressure is admitted to the left hand end of cylinder 128, fluid is admitted to the right hand end of cylinder 130. The cam plate 106 is locked because the cam link 114 is lodged in the cam notch 108. Consequently, the cylinder 130 will move to the right or rearwardly and swing the wheel 36 in a clockwise direction or toward the forward end of the machine. This is illustrated in Fig. 9. When the intermediate abutment 122 passes the forward or left hand end of the cam link 114, the piston rod 142 will move forwardly. This occurs because there is less resistance to the movement of the piston rod 142 than there is created by the resistance offered by the ground wheel 36. The piston rod 142 is permitted to move since the cam notch 108 will shift the cam link 114 to the left or forwardly. The piston rod 142 will continue to move forwardly and rotate the cam lever 110 and cam plate 106 in a counterclockwise direction and cause the right hand plow assembly to be vertically reversed, as indicated by the reversed positions of the vertical broken lines 68 and 74 in Figs. 9 and 11.

It may be apparent, but it is thought best to call attention to the fact that the pairs of Figs. 6 and 7, 8 and 9, and 10 and 11 represent, respectively, the positions of the left and right hand plow assemblies and wheel units as the plow is reversed.

When the device is in the position of Fig. 3, also shown in Figs. 6 and 7, the first movement is of the wheel 36. The mechanism of Fig. 6 cannot move first since it is held by the catch 172 shown also in Fig. 3. The cam plate 106 of Figs. 3 and 7 cannot initially move because it is held by the cam link 114 in the cam notch 108. The wheel 36 initially swings from the position of Fig. 7 to that of Fig. 9. In the latter position the cam plate 116 on the wheel axle section 24 will release the cam link 114, permitting the cam plate 106 to move in a counterclockwise direction and shift the cam link 114 to the left. This withdraws the latch bar 154 from its position in Figs. 3, 7 and 9 where it overlies the lateral extension 146 on the plow unit supporting plate 64.

As the cam plate 106 rotates, and after the latch bar 154 is released, the abutment 124 on said cam plate 106 will strike the crank arm 168 and release the catch hook 166. This frees the lateral extension 144 on the plow unit supporting plate 48. Then the cam plate 88 can move in a clockwise direction. When the plows are reversed the release of the latch bar 156 and catch hook 172 are accomplished in a similar manner.

The device disclosed herein provides for efficient reversal of the plow units with a simple manual control. This control is not shown but, as stated above, is a simple reversing valve to cause a flow of fluid under pressure to either end of the cylinders 128 and 130.

It is possible to place the apparatus in a nonplowing or carrying position by halting the application of fluid pressure when one side of the unit has been reversed and before reversal of the other side has been completed. This will leave both wheels 36 and 38 in the positions of Figs. 8 through 11 and the plowshare units will be maintained out of contact with the ground.

The device is sturdy in structure and actually more simple in operation than is indicated by the disclosure in the drawings. It permits the operator to turn the machine around on the ground at the end of a furrow and start back with a new series of furrows immediately adjacent the preceding furrows with the furrows thrown in the same direction.

It will be understood that various changes can be made in the form and details of the device without departing from the spirit of the invention.

I claim:

1. In a plow, a frame supporting ground wheel having a support in the form of a frame connection swingable longitudinally of the frame in an arc to raise and lower the frame, a plowshare support swingable on said frame and relative to said wheel support, a pair of movable power devices having a common power source connection, one of said power devices being connected to said ground wheel frame connection to swing the same, the other power device being connected to said plowshare support to swing the same, a control device having portions movable into locking positions relative to said wheel support and plowshare support in response to the relative positions of said supports.

2. In a plow, a frame, a pair of ground wheels independently and movably connected to said frame to raise and lower the same, a pair of plowshare supports connected to said frame and swingable to vertically reversed positions relative to the frame, a fluid pressure piston and cylinder unit including piston and cylinder parts, one of said parts being connected to one of said ground wheels, the other of said parts being connected to one of said plowshare supports, a second cylinder and piston unit similarly connected to the other ground wheel and the other plowshare support, a common source of fluid pressure having reverse flow connections with each of said cylinders at both sides of each of said pistons, and a control assembly connected between each wheel and plowshare support to control movement of the wheel relative to the plowshare support and vice versa, one of said cylinder and piston parts being operative to move its connected ground wheel or plowshare support, depending upon the position of said control unit relative to the ground wheel and plowshare support.

3. The structure in claim 2, and a plowshare support locking assembly on said frame and having portions respectively connected to a part of each cylinder and piston unit, said locking assembly being operable to lock its respective plowshare support in one position of the support and to release said support preparatory to movement thereof.

4. In a plow, a frame, a ground wheel unit connected to said frame for swinging movement in an arc longitudinally of the frame to raise and lower the same, a plowshare support mounted on said frame for swinging movement in a plane generally longitudinally of said frame, a link between said wheel unit and said plowshare support and shiftable toward and away from the wheel unit and plowshare support, abutment structure on said wheel unit and on said plowshare support for engaging said link when the link is moved toward either said wheel unit or plowshare support, and additional structure on said wheel unit and plowshare support for moving said link out of the path of either abutment.

SIGURD KALTOFT.

REFERENCES CITED

The following references are of record in the file of this patent:

UNITED STATES PATENTS

| Number | Name | Date |
| --- | --- | --- |
| 118,694 | Coreth | Sept. 5, 1871 |
| 2,079,595 | Collins | May 11, 1937 |
| 2,153,824 | Collins | Apr. 11, 1939 |
| 2,552,097 | Kaltoft | May 8, 1951 |